(12) United States Patent
Funaki (10) Patent No.: US 9,809,116 B2
(45) Date of Patent: Nov. 7, 2017

(54) INFORMATION PROCESSING APPARATUS AND RECORDING MEDIUM

(71) Applicant: FUJITSU LIMITED, Kawasaki-shi, Kanagawa (JP)

(72) Inventor: Isao Funaki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/174,367

(22) Filed: Jun. 6, 2016

(65) Prior Publication Data
US 2016/0280070 A1    Sep. 29, 2016

Related U.S. Application Data

(63) Continuation of application No. PCT/JP2013/084528, filed on Dec. 24, 2013.

(51) Int. Cl.
*B60K 35/00* (2006.01)
*B60R 25/24* (2013.01)

(52) U.S. Cl.
CPC ............. *B60K 35/00* (2013.01); *B60R 25/24* (2013.01); *B60R 2325/101* (2013.01); *B60R 2325/205* (2013.01)

(58) Field of Classification Search
CPC ... B60K 35/00; B60R 25/24; B60R 2325/101; B60R 2325/205
See application file for complete search history.

(56) References Cited

U.S. PATENT DOCUMENTS

| | | |
|---|---|---|
| 2004/0230318 A1 | 11/2004 | Shimizu |
| 2007/0043489 A1 | 2/2007 | Alrabady et al. |
| 2009/0307774 A1 | 12/2009 | Shimizu |

(Continued)

FOREIGN PATENT DOCUMENTS

| | | |
|---|---|---|
| DE | 19548019 A1 | 8/1996 |
| EP | 2228270 A1 | 9/2010 |
| EP | 2387005 A2 | 11/2011 |

(Continued)

OTHER PUBLICATIONS

EESR—The Extended European Search Report dated Nov. 28, 2016 for European Application No. 3900529.2.

(Continued)

*Primary Examiner* — Anne M Antonucci
(74) *Attorney, Agent, or Firm* — Fujitsu Patent Center (57) ABSTRACT

Because an information processing apparatus includes an analyzing unit that analyzes, when a control instruction operated from a terminal device satisfies a first condition, whether the control instruction is the content that includes therein an additional condition that is related to the first condition; an additional condition determination unit that determines, when it is analyzed that the control instruction is the content that includes therein the additional condition related to the first condition, whether the control instruction satisfies the additional condition; a second determination unit that determines, when it is determined that the control instruction satisfies the additional condition, whether the control instruction satisfies a second condition; and processing units that perform a process in accordance with the determination performed by the second determination unit, it is possible to improve the reliability of execution related to the control instruction sent from outside.

5 Claims, 6 Drawing Sheets

(56) References Cited

U.S. PATENT DOCUMENTS

2013/0183957 A1     7/2013   Iwasaki

FOREIGN PATENT DOCUMENTS

| | | |
|---|---|---|
| JP | 08-280069 | 10/1996 |
| JP | 2003-195909 | 7/2003 |
| JP | 2004-178559 | 6/2004 |
| JP | 2013-148435 | 8/2013 |

OTHER PUBLICATIONS

International Search Report and Written Opinion of the International Searching Authority (Form PCT/ISA/210, Form PCT/ISA/237), mailed in connection with PCT/JP2013/084528 and dated Mar. 11, 2014 (10 pages).

JPOA—Japanese Office Action dated Jun. 6, 2017 for Japanese Patent Application No. 2015-554341, with machine English translation.

| COMMAND ID | SEQUENCE | | VEHICLE STATE | EXECUTION PERMISSION/REJECTION | COMMAND MEANING |
|---|---|---|---|---|---|
| | FIRST CONDITION | ADDITIONAL CONDITION | SECOND CONDITION | | |
| 639 | MOVE SEAT POSITION FORWARD OR BACKWARD | 3 TIMES OR MORE/SECOND | OTHER THAN BEING PARKED | NG | MOVING SEAT |
| 640 | MOVE RUDDER ANGLE OF STEERING WHEEL TO LEFT OR RIGHT BY 45 DEGREES | 3 TIMES OR MORE/SECOND | DURING DRIVING OVER 4 KM PER HOUR | NG | MOVING STEERING WHEEL |
| 641 | TURN ACCELERATOR OPENING TO 100% | - | - | NG | SUDDEN ACCELERATION |
| 642 | TURN BRAKE PRESSURE TO 100% | - | DURING DRIVING OVER 15 KM PER HOUR | NG | SUDDEN BRAKING |
| 643 | INCREASE ACCELERATOR OPENING BY 10% OR MORE | - | ANGLE OF STEERING WHEEL IS 15 DEGREES OR MORE | NG | ACCELERATION WHEN APPROACHING CURVE |
| 644 | LOCK DOOR LOCK | - | DURING BEING PARKED AND LOCKED | NG | LOCK |
| 645 | TURN ACCELERATOR OPENING TO PLUS FROM PRESENT STATE | - | DURING BRAKE BEING PRESSED | NG | ACCELERATION |
| | | | DURING SIDE BRAKE BEING PULLED | | |
| | | | DURING ENGINE BRAKE BEING OPERATED | | |
| 646 | TURN OFF DIRECTION INDICATOR LAMP | - | RUDDER ANGLE OF STEERING WHEEL IS 5 DEGREES OR MORE IN LEFT OR RIGHT DIRECTION AND OTHER THAN BEING PARKED | NG | TURN OFF DIRECTION INDICATOR LAMP |
| OTHER THAN ABOVE | - | - | - | OK | NORMAL OPERATION |

FIG.4

INFORMATION PROCESSING APPARATUS AND RECORDING MEDIUM

CROSS-REFERENCE TO RELATED APPLICATION

This application is a continuation application of International Application PCT/JP2013/084528, filed on Dec. 24, 2013, and designating the U.S., the entire contents of which are incorporated herein by reference.

FIELD

The embodiment discussed herein is directed to an information processing apparatus and a data filtering program.

BACKGROUND

Conventionally, there are known in-vehicle devices that have a function serving as devices for connecting different networks (for example, see Patent Literature 1). With this technology, an in-vehicle device receives, from, for example, a mobile terminal, control information that includes therein both operation information that indicates the operation content that is used to control the in-vehicle device and information that specifies the mobile terminal. Then, the in-vehicle device determines whether the in-vehicle device accepts the operation specified by the operation information on the condition that the mobile terminal that has sent the control information is the mobile terminal that is allowed to perform a keyless entry and, if the in-vehicle device accepts the operation, the in-vehicle device performs a process in accordance with the operation information.

Patent Literature 1: Japanese Laid-open Patent Publication No. 2013-148435

However, with the conventional in-vehicle device, there is a problem in that, even if data sent from outside is malicious data, if the transmission source of the data is authorized, the in-vehicle device performs a process in accordance with the data. For example, in the conventional technology, if a mobile terminal that has sent the control information, in which both the operation information and the information that specifies the mobile terminal are included, is a mobile terminal that is allowed to perform a keyless entry, the in-vehicle device performs, in accordance with the operation information, the function that is allowed to perform the operation specified by the operation information. Accordingly, even if the operation information is malicious information, if the operation information is from the mobile terminal that is the transmission source is authorized, the in-vehicle device performs the function that is permitted to perform the operation specified by the operation information.

SUMMARY

In one aspect, the present invention is an information processing apparatus that executes a control instruction operated from a terminal device. The information processing apparatus includes a processor and a memory. The processor executes analyzing, when the control instruction operated from the terminal device satisfies a first condition, whether the control instruction is the content that includes therein an additional condition that is related to the first condition. The processor executes first determining, when it is analyzed at the analyzing that the control instruction is the content that includes therein the additional condition that is related to the first condition, whether the control instruction satisfies the additional condition. The processor executes second determining, when it is determined at the first determining that the control instruction satisfies the additional condition, whether the control instruction satisfies a second condition. The processor executes executing a process in accordance with the determination performed at the second determining.

The object and advantages of the invention will be realized and attained by means of the elements and combinations particularly pointed out in the claims.

It is to be understood that both the foregoing general description and the following detailed description are exemplary and explanatory and are not restrictive of the invention.

EMBODIMENT FOR CARRYING OUT THE INVENTION (DESCRIPTION OF EMBODIMENTS)

A preferred embodiment of an information processing apparatus and a data filtering program disclosed in the present invention will be described in detail below with reference to the accompanying drawings. Furthermore, the present invention is not limited to the embodiment.

Configuration of a Data Filtering System

Figure 1:
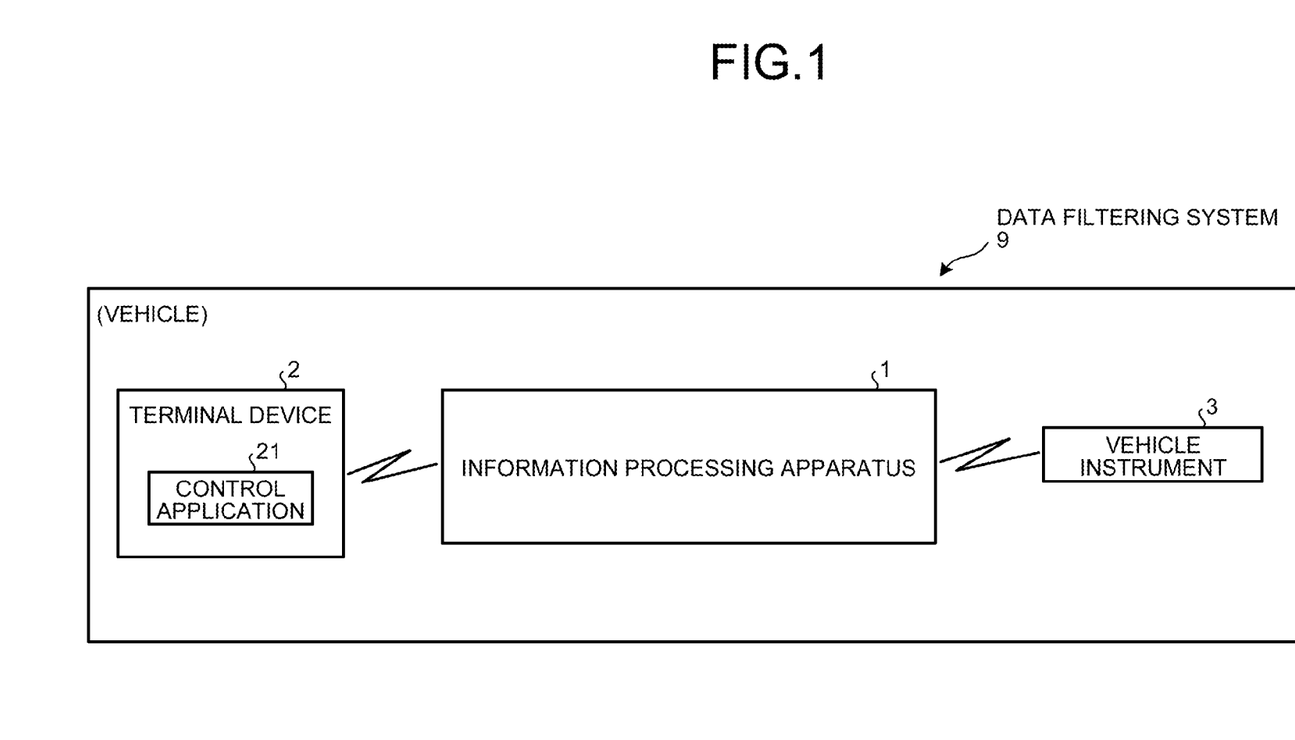
FIG. 1 is a block diagram illustrating the configuration of a data filtering system according to an embodiment.

FIG. 1 is a block diagram illustrating the configuration of a data filtering system according to an embodiment. As illustrated in FIG. 1, a data filtering system 9 includes an information processing apparatus 1, a terminal device 2, and a vehicle instrument 3. The data filtering system 9 establishes a communication connection between the terminal device 2 and the information processing apparatus 1 and performs various kinds of communication from the information processing apparatus 1 to the vehicle instrument 3. An example of the communication connection between the terminal device 2 and the information processing apparatus 1 includes, for example, a connection due to near field wireless communication, such as Bluetooth (registered trademark).

The vehicle instrument 3 is an instrument mounted on a vehicle and an example thereof includes, for example, a driver's seat, a steering wheel, an accelerator, a brake, a meter, and the like.

The terminal device 2 has an operation function and a communication function and corresponds to, for example, a tablet representing portable type computer and a terminal device, such as a smartphone, a mobile phone, a personal handyphone system (PHS), a personal digital assistant (PDA), or the like. Namely, the terminal device 2 may be a terminal device that has a communication function and that can be brought in a vehicle.

In the terminal device 2, a control application 21 is installed. The control application 21 is an application that controls the vehicle instrument 3. As an example, the control application 21 is an application that controls a driver's seat, an application that controls a steering wheel, or an application that controls an accelerator. Namely, in the data filtering system 9, for example, a driver who drives a vehicle brings the terminal device 2 into the vehicle and uses the terminal device 2 as a control panel of the vehicle via the control application 21. A driver starts up the control application 21 by using, for example, an operation button mounted on the terminal device 2. If the control application 21 is started up, the driver outputs a control instruction in accordance with the operation to the information processing apparatus 1. At this point, the control application 21 is downloaded from the site of, for example, a valid manufacturer that produced the vehicle. However, there may be a case in which the control application 21 is infected with a virus and may possibly be altered. If the control application 21 is altered, for example, the altered control application 21 may possibly execute the malicious data on the vehicle instrument 3. Thus, if the control application 21 is altered, the information processing apparatus 1, which will be described later, performs filtering (sorting) on the malicious data. Furthermore, a description has been given of a case in which the control application 21 is started up by the driver using the operation button mounted on the terminal device 2; however, the control application 21 is not limited to this. The control application 21 may also be resident in a memory at the timing at which the power supply of the terminal device 2 is turned ON.

When the information processing apparatus 1 executes, on the vehicle, the data operated from outside of the vehicle, the information processing apparatus 1 verifies a data sequence and the state of the vehicle and performs filtering on the malicious data. The data sequence mentioned here is, for example, behavior of the operated data from the past to the present. Hereinafter, the data that is operated from outside the vehicle is referred to as a "control command".

Configuration of the Information Processing Apparatus

Figure 2:
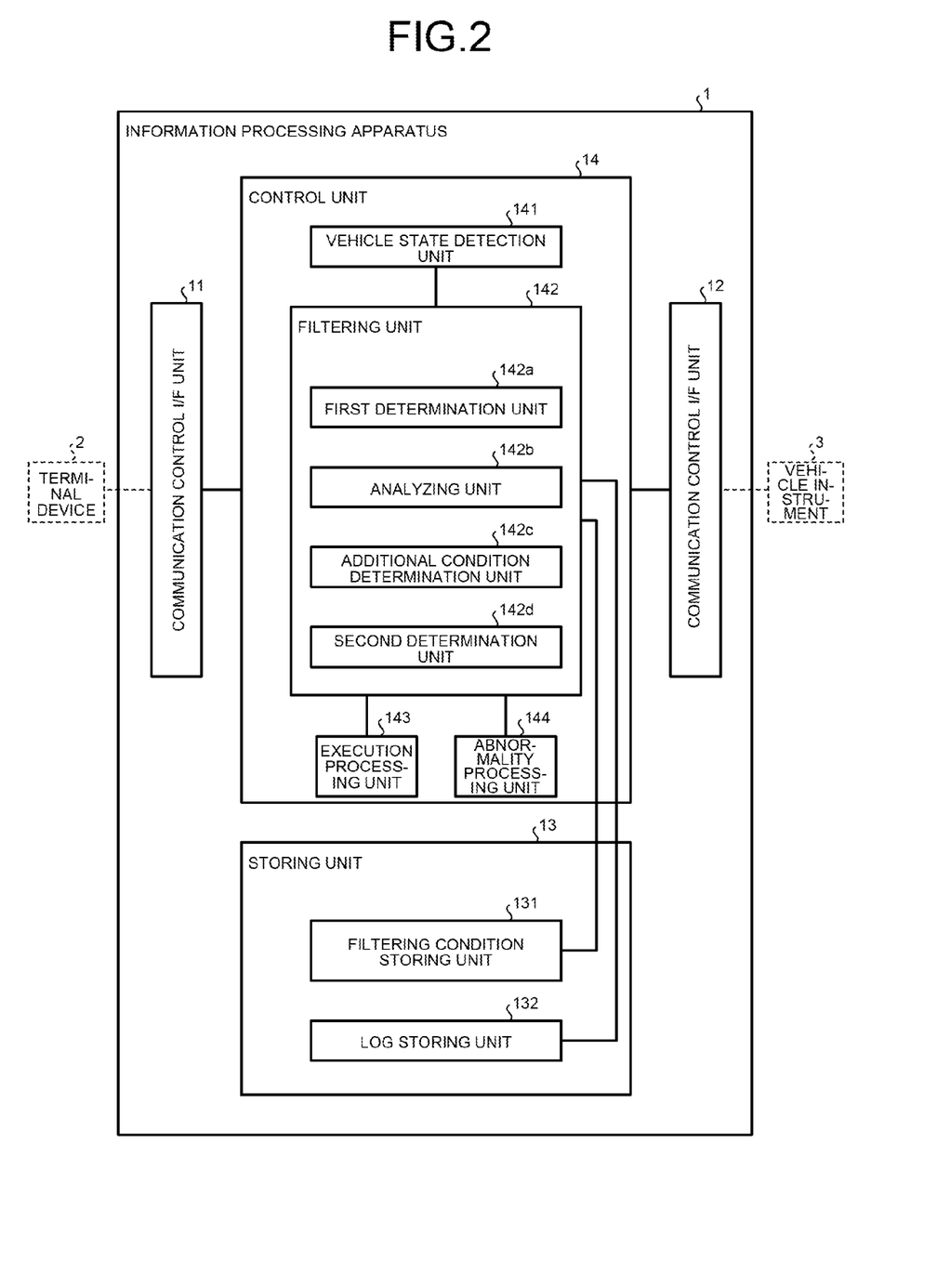
FIG. 2 is a block diagram illustrating the configuration of an information processing apparatus according to the embodiment.

FIG. 2 is a block diagram illustrating the configuration of an information processing apparatus according to the embodiment. As illustrated in FIG. 2, the information processing apparatus 1 includes communication control I/F units 11 and 12, a storing unit 13, and a control unit 14. The communication control I/F unit 11 is an interface that controls communication with the terminal device 2. The communication control I/F unit 12 is an interface that controls communication with the vehicle instrument 3.

The storing unit 13 corresponds to a storage device including a nonvolatile semiconductor memory device or the like, such as a flash memory, a Ferroelectric Random Access Memory (FRAM) (registered trademark), or the like. Furthermore, the storing unit 13 includes a filtering condition storing unit 131 and a log storing unit 132.

The filtering condition storing unit 131 stores therein a plurality of patterns of conditions for sorting (filtering) the control command operated from outside. Namely, the filtering condition storing unit 131 stores therein the condition that is used to detect a malicious control command. The filtering condition storing unit 131 is downloaded from the download source of the control application 21 at the timing at which, for example, the control application 21 is downloaded to the terminal device 2. Furthermore, the data structure of the filtering condition storing unit 131 will be described later.

The log storing unit 132 stores therein the control command operated from outside. The log storing unit 132 is stored by a filtering unit 142 that will be described later. Furthermore, the data structure of the log storing unit 132 will be described later.

The control unit 14 includes an internal memory that stores therein control data and programs in which various kinds of procedures are prescribed, whereby the control unit 14 executes various kinds of processes. Furthermore, the control unit 14 corresponds to, for example, an electronic circuit in an integrated circuit, such as an application specific integrated circuit (ASIC), a field programmable gate array (FPGA), or the like. Alternatively, the control unit 14 corresponds to an electronic circuit, such as a central processing unit (CPU), a micro processing unit (MPU), or the like. Furthermore, the control unit 14 includes a vehicle state detection unit 141, the filtering unit 142, an execution processing unit 143, and an abnormality processing unit 144.

The vehicle state detection unit 141 detects a vehicle state of the vehicle instrument 3. For example, the vehicle state detection unit 141 detects, as a vehicle state, whether a vehicle is making a stop, is being parked, is accelerating, is decelerating, is making a left turn, is making a right turn, or the like.

On the basis of the filtering condition stored in the filtering condition storing unit 131, the filtering unit 142 performs filtering on the control command operated from outside by referring to both the logs stored in the log storing unit 132 and the vehicle state. Furthermore, the filtering unit 142 includes a first determination unit 142a, an analyzing unit 142b, an additional condition determination unit 142c, and a second determination unit 142d.

Figure 3:
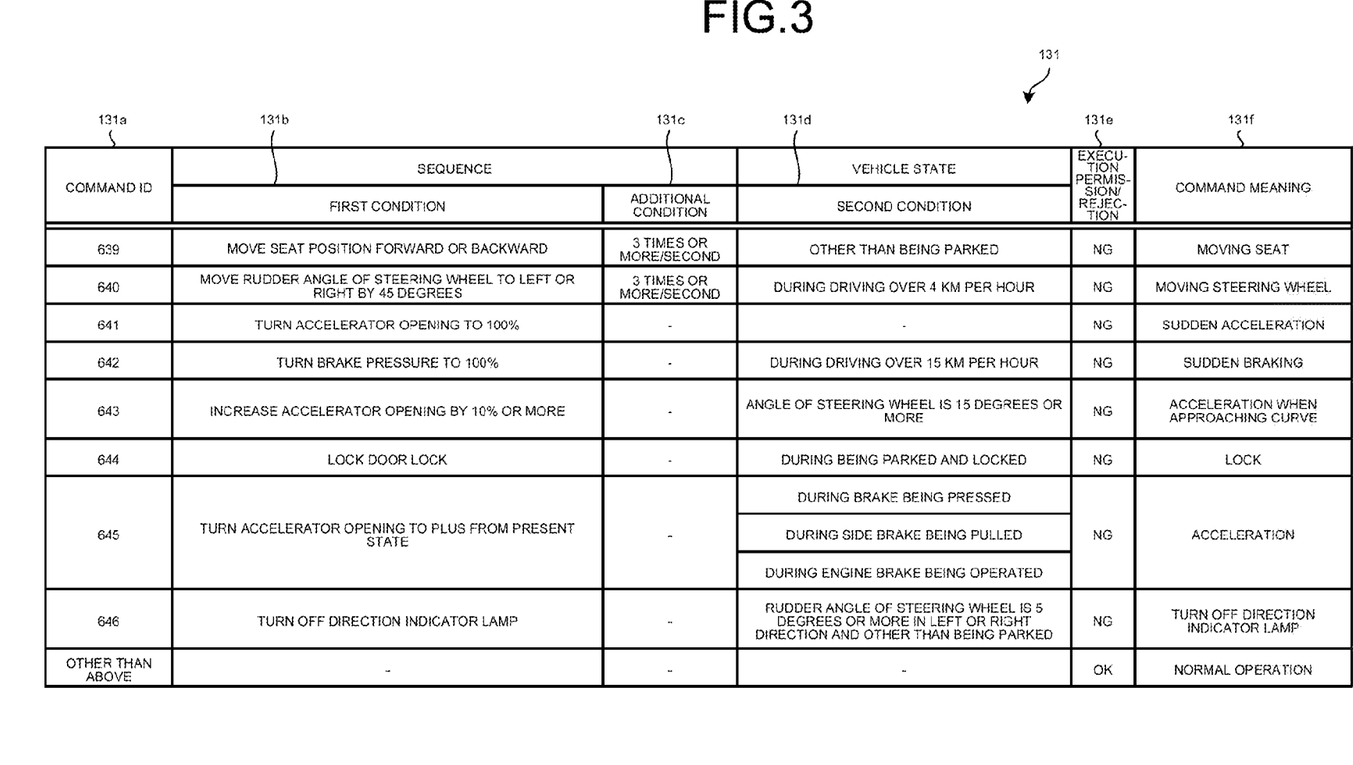
FIG. 3 is a schematic diagram illustrating an example of the data structure of a filtering condition storing unit according to the embodiment.

In the following, the data structure of the filtering condition storing unit 131 will be described with reference to FIG. 3. FIG. 3 is a schematic diagram illustrating an example of the data structure of a filtering condition storing unit according to the embodiment. As illustrated in FIG. 3, the filtering condition storing unit 131 stores therein, as the condition of a sequence, a first condition 131b and an additional condition 131c such that the first condition 131b and the additional condition 131c are associated with a command identification (ID) 131a. Furthermore, the filtering condition storing unit 131 stores therein, as the condition of a vehicle state, a second condition 131d such that the second condition 131d is associated with the command ID 131a. Furthermore, the filtering condition storing unit 131 stores therein execution permission/rejection 131e such that the execution permission/rejection 131e is associated with the command ID 131a. Furthermore, command meaning 131f illustrated in FIG. 3 is a supplementary explanation indicating an intention of the subject command.

The command ID 131a is an identifier of the control command operated from the terminal device 2. The command ID 131a differs for each operation. In the first condition 131b as the condition of a sequence, for the command indicated by the command ID 131a, a condition that may possibly be malicious is set. The additional condition 131c as the condition of a sequence is the condition related to the first condition 131b. In the additional condition 131c, regarding the sequence (behavior) of the command indicated by the command ID 131a, a condition that may possibly be malicious is set.

In the second condition 131d as the condition of the vehicle state, regarding the state of the vehicle instrument 3, a condition that may possibly be malicious when the command indicated by the command ID 131a is accepted is set. The execution permission/rejection 131e is permission or rejection of the command indicated by the command ID 131a. For example, in the execution permission/rejection 131e, either one of "OK" that indicates permission of the execution and "NG" that indicates rejection of the execution is set. Furthermore, if the additional condition 131c is set, the filtering unit 142, which will be described later, performs the process in accordance with the execution permission/rejection 131e if the command indicated by the command ID 131a satisfies all the first condition 131b, the additional condition 131c, and the second condition 131d. For example, if the execution permission/rejection 131e is "NG", the execution is halted. Furthermore, if the additional condition 131c is not set and if the command indicated by the command ID 131a satisfies all the first condition 131b and the second condition 131d, the filtering unit 142 performs the process in accordance with the execution permission/rejection 131e. For example, if the execution permission/rejection 131e is "NG", the execution is halted.

As an example, if the command ID 131a is "639", "moving a seat" is stored as the command meaning 131f. Regarding the condition of a sequence, "moving a seat position forward or backward" is stored as the first condition 131b and "three times or more/second" is stored as the additional condition 131c. Regarding the condition of a vehicle state, "other than being parked" is stored as the second condition 131d. As the execution permission/rejection 131e, "NG" is stored. Namely, if the command of "639" indicated by the command ID 131a is the command of "moving a seat position forward or backward" and is accepted by "three times or more/second" and if the vehicle instrument 3 is "other than being parked", the execution of the subject command is halted. Namely, if the command of "moving a seat position forward or backward" is accepted by the number of "three times or more/second", it is determined that the subject command is a malicious command on the basis of the condition that the vehicle is running. This is because it is dangerous if the seat position is moved many times when the vehicle is being operated. In contrast, even if the command of "639" is the command of "moving a seat position forward or backward", the execution proceeds unless the command is accepted "three times or more/second". Namely, if the command of "moving a seat position forward or backward" is not accepted "three times or more/second", it is not dangerous even if the seat position is moved; therefore, it is determined that the subject command is not a malicious command. Furthermore, even if the command of "639" is the command of "moving a seat position forward or backward" and is accepted "three times or more/second", the execution proceeds unless the vehicle instrument 3 is "other than being parked" (if the vehicle instrument 3 is being parked). Namely, even if the command of "moving a seat position forward or backward" is accepted "three times or more/second", if the vehicle is parked, it is safe even if the seat position is moved; therefore, it is determined that the subject command is not a malicious command.

As another example, if the command ID 131a is "640", "moving a steering wheel" is interpreted as the command meaning 131f. Regarding the condition of a sequence, "moving the rudder angle of a steering wheel to the left or the right by 45 degrees" is stored as the first condition 131b and "three times or more/second" is stored as the additional condition 131c. Regarding the condition of a vehicle state, "driving at over 4 km per hour" is stored as the second condition 131d. As the execution permission/rejection 131e, "NG" is stored. Namely, if the command of "640" indicated by the command ID 131a is the command of "moving the rudder angle of a steering wheel to the left or the right by 45 degrees" and is accepted "three times/seconds or more" and if the vehicle instrument 3 is "driving at over 4 km per hour", the execution is halted. Namely, if the command of "moving the rudder angle of a steering wheel to the left or the right by 45 degrees" is accepted "three times or more/second", it is determined that the subject command is a malicious command on the basis of the condition that the vehicle is driving at over 4 km per hour. This is because it is dangerous if the rudder angle of a steering wheel is moved to the left or the right by 45 degrees when the vehicle is driving at over 4 km per hour. In contrast, even if the command of "640" is the command of "moving the rudder angle of a steering wheel to the left or the right by 45 degrees", the execution proceeds unless the command is accepted "three times/seconds or more". Namely, if the command of "moving the rudder angle of a steering wheel to the left or the right by 45 degrees" is not accepted "three times or more/second", it is determined that the command is not a malicious command. Furthermore, even if the command of "640" is the command of "moving the rudder angle of a steering wheel to the left or the right by 45 degrees" and is accepted "three times/seconds or more", the execution proceeds unless the vehicle instrument 3 is "driving at over 4 km per hour". Namely, even if the command of "moving the rudder angle of a steering wheel to the left or the right by 45 degrees" is accepted "three times or more/second", it is determined that the subject command is not a malicious command unless the vehicle is driving at over 4 km per hour. This is considered by assuming parking in a garage or a K-turn at a crank.

Furthermore, the first condition 131b, the additional condition 131c, and the second condition 131d that are stored in the filtering condition storing unit 131 illustrated in FIG. 3 are exemplifications and are not limited to these.

Figure 4:
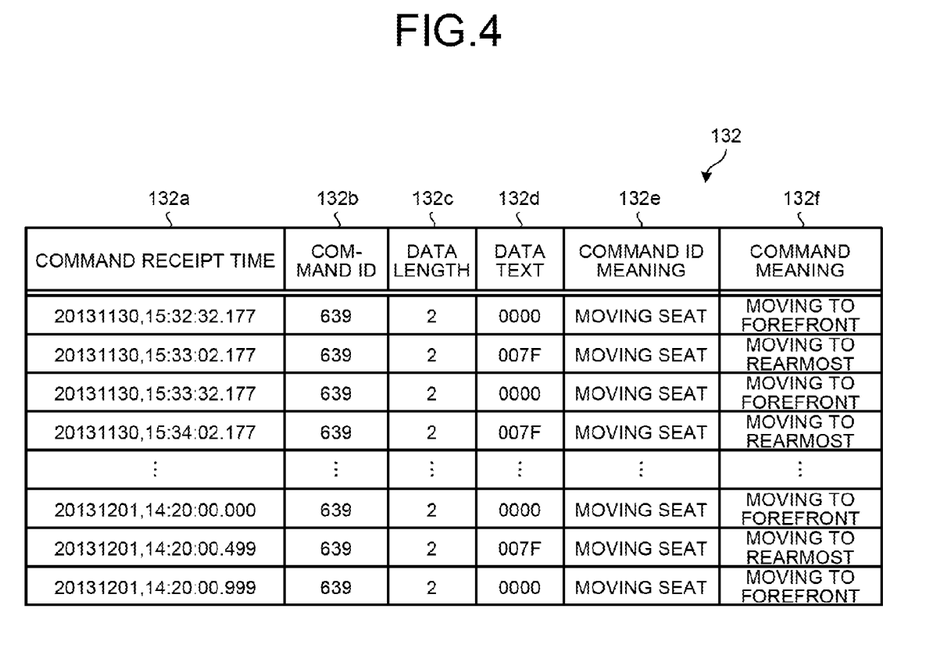
FIG. 4 is a schematic diagram illustrating an example of the data structure of a log storing unit according to the embodiment.

In the following, the data structure of the log storing unit 132 will be described with reference to FIG. 4. FIG. 4 is a schematic diagram illustrating an example of the data structure of a log storing unit according to the embodiment. As illustrated in FIG. 4, the log storing unit 132 stores therein a command receipt time 132a, a command ID 132b, a data length 132c, and a data text 132d in an associated manner. Furthermore, command ID meaning 132e and command meaning 132f illustrated in FIG. 4 are supplementary explanations indicating the overall intention of this command and are not the entity of the data structure. The command receipt time 132a is the time at which a control command is operated from the terminal device 2. The command ID 132b is an identifier of a control command operated from the terminal device 2 and is associated with the command ID 131a in the filtering condition storing unit 131. In the command ID 132b, the command ID included in the control command is set. The data length 132c is the length (bytes) of the data in the control command. The data text 132d is the text of the data included in the control command. In the data text 132d, the text of the data included in the control command is set. Furthermore, data text is a detailed processing operation and is represented by, for example, an operand.

As an example, if the command receipt time 132a is "20131130, 15:32:32.177" (11/30/2013, 15:32:32), "639" is stored as the command ID 132b. As the data length 132c, "2" (bytes) is stored and, as the data text 132d, "0000" is stored. This means "moving a seat" and "moving to the forefront".

A description will be given here by referring back to FIG. 2. The first determination unit 142a determines whether the control command operated from the terminal device 2 satisfies the first condition. For example, the first determination unit 142a determines whether the command ID 131a of the received control command is set in the filtering condition storing unit 131. If the command ID 131a of the received control command is set, the first determination unit 142a determines whether the subject control command satisfies the first condition 131b that is associated with the set command ID 131a.

As an example, a description will be given by using the filtering condition storing unit 131 illustrated in FIG. 3. It is assumed that the command ID of the received control command is "639" (moving a seat) and the data text of the subject control command is "0000" that indicates "moving to the forefront". Then, because the first condition 131b associated with the command ID 131a of "639" indicates that "moving a seat position forward or backward", the first determination unit 142a determines that the subject control command with the data text of "moving to the forefront" satisfies the first condition 131b. Furthermore, if the control command operated by the terminal device 2 does not satisfy all of the first conditions 131b illustrated in FIG. 3, the first determination unit 142a allows the execution processing unit 143, which will be described later, to perform the process associated with the subject control command. This configuration may also be set such that, in accordance with the setting content of the condition in the filtering condition storing unit 131, the execution processing unit 143 is not allowed to perform the process unless any one of the conditions is satisfied.

If the control command satisfies the first condition, the analyzing unit 142b analyzes whether the subject control command is the content including the additional condition related to the first condition. For example, the analyzing unit 142b analyzes whether the additional condition 131c that is associated with the command ID 131a of the control command that satisfies the first condition 131b is set in the filtering condition storing unit 131. If the additional condition 131c is set, the analyzing unit 142b analyzes that the control command is the content that includes therein the additional condition 131c related to the first condition 131b. In contrast, if the additional condition 131c is not set, the analyzing unit 142b analyzes that the control command is the content that includes therein the additional condition 131c related to the first condition 131b.

As an example, a description will be given by using the filtering condition storing unit 131 illustrated in FIG. 3. If the command ID 131a of the control command that satisfies the first condition 131b is "639" or "640", the additional condition 131c is set; therefore, it is analyzed that the subject control command is the content that includes therein the additional condition 131c related to the first condition 131b. In contrast, if the command ID 131a of the control command that satisfies the first condition 131b is one of "641" to "646", the additional condition 131c is not set; therefore, it is analyzed that the subject control command is the content that does not include therein the additional condition 131c related to the first condition 131b.

If it is analyzed that the subject control command is the content that includes therein the additional condition 131c related to the first condition 131b, the additional condition determination unit 142c determines whether the subject control command satisfies the additional condition. For example, the additional condition determination unit 142c determines, by using the logs stored in the log storing unit 132, whether the control command, which is analyzed by the analyzing unit 142b that the control command is the content that includes therein the additional condition 131c, satisfies the additional condition 131c in terms of the relationship between the control command that was operated in the past.

As an example, a description will be given by using the filtering condition storing unit 131 illustrated in FIG. 3 and the log storing unit 132 illustrated in FIG. 4. If the time point is "20131201, 14:20:00.000", the command ID of the received control command is "639" (moving a seat) and the text of the data on the subject control command is "0000" that indicates "moving to the forefront". At this point, if the additional condition determination unit 142c refers to the log storing unit 132 by going back to the past, because the control command "639" that satisfies the first condition 131b is not present equal to or greater than three times a second, the additional condition determination unit 142c determines that the additional condition 131c is not satisfied. In also a case in which the time point is "20131201, 14:20:00.499", the additional condition determination unit 142c determines that the additional condition 131c is not satisfied. However, if the time point is "20131201, 14:20:00.999", when the additional condition determination unit 142c refers to the log storing unit 132 by going back to the past, because the control command that has the command ID of "639" and that satisfies the first condition 131b is present equal to or greater than three times a second, such as " . . . 14:20:00.499" and " . . . 14:20:00.000", the additional condition determination unit 142c determines that "three times or more/second" that is the additional condition 131c is satisfied. Furthermore, the additional condition determination unit 142c allows the execution processing unit 143, which will be described later, to perform the process associated with the subject control command unless all of the control commands illustrated in FIG. 3 satisfy the additional condition 131c. This configuration may also be set such that, in accordance with the setting content of the condition in the filtering condition storing unit 131, the execution processing unit 143 is not allowed to perform the process unless any one of the conditions is satisfied.

If it is determined that the control command satisfies the additional condition, the second determination unit 142d determines whether the subject control command satisfies the second condition. For example, the second determination unit 142d determines whether, by using the vehicle state detected by the vehicle state detection unit 141, the control command, which is determined to satisfy the additional condition 131c, satisfies the second condition 131d in the filtering condition storing unit 131.

As an example, a description will be given by using the filtering condition storing unit 131 illustrated in FIG. 3. It is assumed that the command ID of the received control command is "639" (moving a seat) and it is assumed that the text of the data on the subject control command is "0000" that indicates "moving to the forefront". Furthermore, it is assumed that the vehicle state detected by the vehicle state detection unit 141 "other than being parked". Then, because the second condition 131d that is associated with the command ID 131a of "639" is "other than being parked" and the vehicle state that is detected by the vehicle state detection unit 141 is "other than being parked", the second determination unit 142d determines that the control command of "639" satisfies the second condition 131d. Furthermore, the second determination unit 142d allows the execution processing unit 143, which will be described later, to perform the process associated with the subject control command unless all of the control commands illustrated in FIG. 3 satisfies the second condition 131d. This configuration may also be set such that, in accordance with the setting content of the condition in the filtering condition storing unit 131, the execution processing unit 143 is not allowed to perform the process unless any one of the conditions is satisfied.

Furthermore, if it is analyzed, by the analyzing unit 142b, that the control command is the content that includes therein the additional condition 131c related to the first condition 131b, the second determination unit 142d determines whether the control command satisfies the second condition 131d. Then, if the control command does not satisfy the second condition 131d, the second determination unit 142d allows the execution processing unit 143, which will be described later, to perform the process associated with the subject control command. This configuration may also be set such that, in accordance with the setting content of the condition in the filtering condition storing unit 131, the execution processing unit 143 is not allowed to perform the process unless any one of the conditions is satisfied.

If it is determined that the control command does not satisfy the first condition, the additional condition, or the second condition, the execution processing unit 143 performs the subject control command on the vehicle instrument 3. For example, the execution processing unit 143 outputs the control command to the subject vehicle instrument 3. This configuration may also be set such that, in accordance with the setting content of the condition in the filtering condition storing unit 131, the execution processing unit 143 is not allowed to perform the process unless any one of the conditions is satisfied.

If it is determined that the control command satisfies the second condition, the abnormality processing unit 144 halts the execution of the subject control command. In addition, the abnormality processing unit 144 outputs information indicating that the subject control command is abnormal. As an example, the abnormality processing unit 144 outputs a warning signal that indicates that the control command operated by the terminal device 2 is abnormal to a warning lamp that is connected to the vehicle instrument 3. As another example, the abnormality processing unit 144 displays, on a monitor connected to the information processing apparatus 1, a warning text that indicates that the control command operated by the terminal device 2 is abnormal.

Flowchart of the Data Filtering Process

Figure 5:
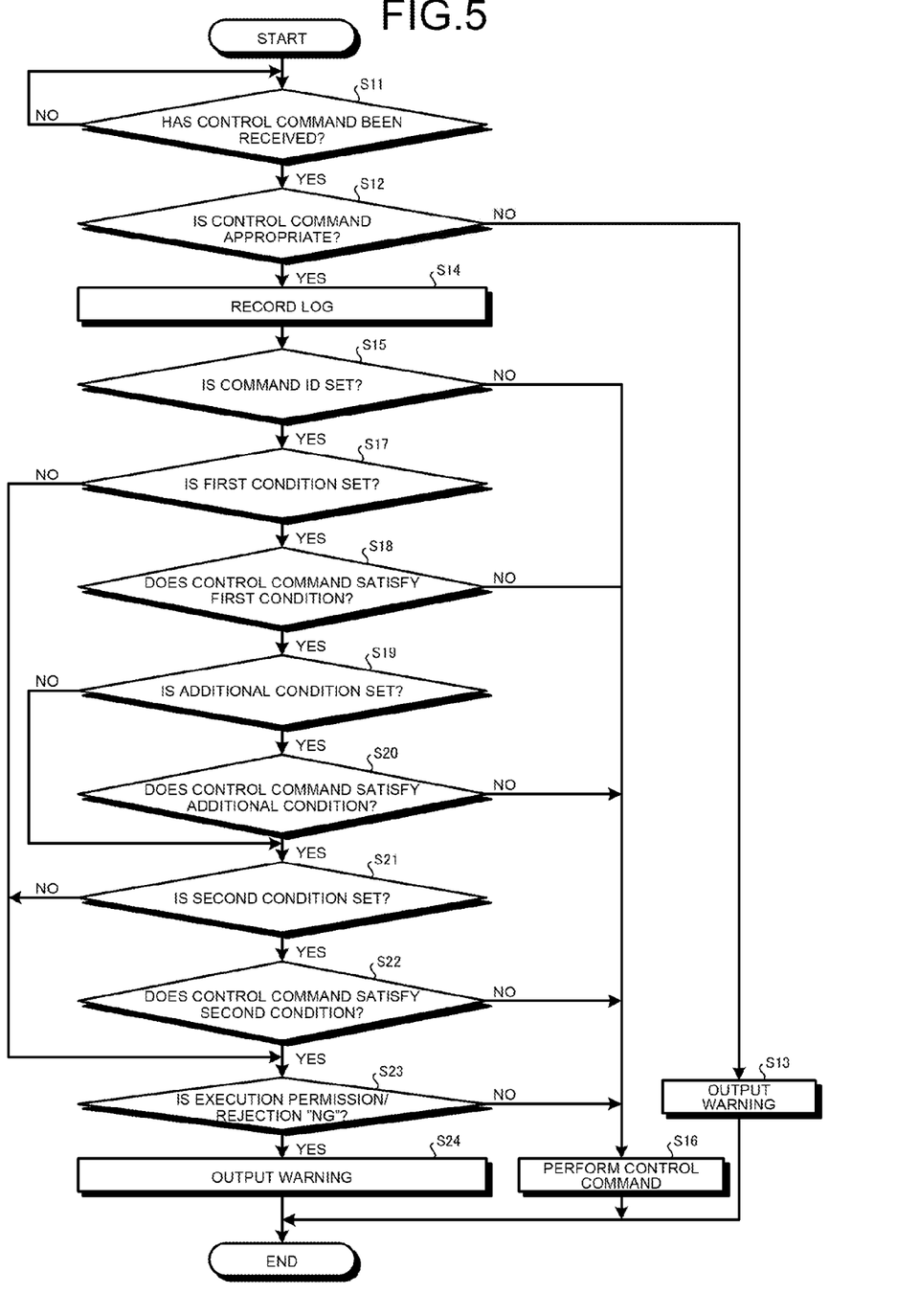
FIG. 5 is a flowchart illustrating the flow of a data filtering process according to the embodiment.

In the following, the flowchart of the data filtering process according to the embodiment will be described with reference to FIG. 5. FIG. 5 is a flowchart illustrating the flow of a data filtering process according to the embodiment.

As illustrated in FIG. 5, the filtering unit 142 determines whether the filtering unit 142 has received the control command that is operated from the terminal device 2 (Step S11). If it is determined that the filtering unit 142 has not received the control command (No at Step S11), the filtering unit 142 repeats the determination process until the filtering unit 142 receives the control command.

If it is determined that the filtering unit 142 has received the control command (Yes at Step S11), the filtering unit 142 determines whether the received control command is appropriate (Step S12). For example, the filtering unit 142 determines whether the command ID of the received control command is the command ID of the control command that is previously defined and that can be performed. Furthermore, the filtering unit 142 determines whether the data text included in the received control command is the data text that is associated with the command ID and that can be performed.

If it is determined that the received control command is not appropriate (No at Step S12), the filtering unit 142 allows the abnormality processing unit 144 to output a warning (Step S13). For example, the abnormality processing unit 144 halts the execution of the control command. Then, the abnormality processing unit 144 outputs, to a warning lamp, a warning signal that indicates that the control command is abnormal. Then, the abnormality processing unit 144 ends the data filtering process.

In contrast, if it is determined that the received control command is appropriate (Yes at Step S12), the filtering unit 142 records the content of the received control command in the log storing unit 132 (Step S14).

Subsequently, the first determination unit 142a determines whether the command ID 131a with respect to the received control command is set in the filtering condition storing unit 131 (Step S15). If the command ID 131a with respect to the control command is not set (No at Step S15), the first determination unit 142a determines that the received control command is not a malicious control command and allows the execution processing unit 143 to perform the subject control command (Step S16). Then, the first determination unit 142a ends the data filtering process.

In contrast, if the command ID 131a with respect to the control command is set (Yes at Step S15), the first determination unit 142a performs the following process. Namely, the first determination unit 142a determines whether the first condition 131b with respect to the subject control command is set in the filtering condition storing unit 131 (Step S17). If the first condition 131b with respect to the control command is not set (No at Step S17), the first determination unit 142a proceeds to Step S23 in order to determine execution permission/rejection.

In contrast, if the first condition 131b with respect to the control command is set (Yes at Step S17), the first determination unit 142a determines whether the subject control command satisfies the first condition 131b (Step S18). For example, the first determination unit 142a refers to the data text included in the control command and determines whether the subject control command matches the first condition 131b.

If the control command does not satisfy the first condition 131b (No at Step S18), the first determination unit 142a determines that the control command is not a malicious control command and proceeds to Step S16 in order to allow the subject control command to be performed. Then, the first determination unit 142a ends the data filtering process.

In contrast, if the control command satisfies the first condition 131b (Yes at Step S18), the analyzing unit 142b determines whether the additional condition 131c with respect to the subject control command is set in the filtering condition storing unit 131 (Step S19). If the additional condition 131c with respect to the control command is not set (No at Step S19), the analyzing unit 142b proceeds to Step S21 in order to allow the second condition to be determined.

In contrast, if the additional condition 131c with respect to the control command is set (Yes at Step S19), the additional condition determination unit 142c determines whether the subject control command satisfies the additional condition 131c (Step S20). For example, the additional condition determination unit 142c refers to the logs stored in the log storing unit 132 and determines whether the control command that is operated this time satisfies the additional condition 131c in terms of the relationship with the control command that was operated in the past. As an example, it is assumed that the additional condition 131c with respect to the control command is "three times or more/seconds". If the content of the control command is stored in the log storing unit 132 three times or more per second, it is determined that the additional condition 131c is satisfied. In contrast, if the content of the control command is not stored in the log storing unit 132 three times or more per second, it is determined that the additional condition 131c is not satisfied.

Then, if the control command does not satisfy the additional condition 131c (No at Step S20), the additional condition determination unit 142c determines that the control command is not a malicious control command and proceeds to Step S16 in order to allow the subject control command to be performed. Then, the additional condition determination unit 142c ends the data filtering process.

In contrast, if the control command satisfies the additional condition 131c (Yes at Step S20), the second determination unit 142d determines whether the second condition 131d with respect to the subject control command is set in the filtering condition storing unit 131 (Step S21). If the second condition 131d with respect to the control command is not set (No at Step S21), the second determination unit 142d proceeds to Step S23 in order to determine execution permission/rejection.

In contrast, if the second condition 131d with respect to the control command is set (Yes at Step S21), the second determination unit 142d determines whether the subject control command satisfies the second condition 131d (Step S22). For example, the second determination unit 142d determines, by using the vehicle state detected by the vehicle state detection unit 141, whether the subject control command satisfies the second condition 131d.

If the control command does not satisfy the second condition 131d (No at Step S22), the second determination unit 142d determines that the control command is not a malicious control command and proceeds to Step S16 in order to allow the subject control command to be performed. Then, the second determination unit 142d ends the data filtering process.

In contrast, if the control command satisfies the second condition 131d (Yes at Step S22), the second determination unit 142d determines whether the execution permission/rejection 131e with respect to the control command is "NG" (Step S23). If the execution permission/rejection 131e with respect to the control command is "NG" (Yes at Step S23), the second determination unit 142d determines that the control command is a malicious control command and allows the abnormality processing unit 144 to output a warning (Step S24). For example, the abnormality processing unit 144 halts the execution of the control command. Then, the abnormality processing unit 144 outputs a warning signal that indicates that the control command is abnormal to a warning lamp. Then, the abnormality processing unit 144 ends the data filtering process.

In contrast, if the execution permission/rejection 131e with respect to the control command is not "NG" (No at Step S23), the second determination unit 142d determines that the control command is not a malicious control command and proceeds to Step S16 in order to allow the subject control command to be performed. Then, the second determination unit 142d ends the data filtering process.

Advantage of the Embodiment

According to the embodiment described above, if a control command satisfies the first condition, the information processing apparatus 1 that performs a control instruction operated from the terminal device 2 analyzes whether the subject control command is the content that includes therein an additional condition related to the first condition. Then, if it is analyzed that the control command is the content that includes therein the additional condition related to the first condition, the information processing apparatus 1 determines whether the control command satisfies the additional condition. Then, if it is determined that the control command satisfies the additional condition, the information processing apparatus 1 determines whether the control command satisfies the second condition. Then, the information processing apparatus 1 performs the process in accordance with the determination whether the control command satisfies the second condition. With this configuration, because the information processing apparatus 1 performs a process of determining, for the control command sent from outside, a condition that includes therein the command history and the state of executing the command by using the additional condition related to the first condition and by using the second condition, it is possible to improve the reliability of executing the control command. For example, if the additional condition is the condition that indicates the number of times of control commands that satisfies the first condition in the predetermined time, because the information processing apparatus 1 can verify the validity of the control command by considering the sequence of the control command, it is possible to improve the reliability of the control command. Furthermore, if the control application 21 installed in the terminal device 2 has been altered, the information processing apparatus 1 can protect the vehicle from a threat that possibly occurs resulting from the alteration irrespective whether the terminal device 2 itself is valid or not.

Furthermore, according to the embodiment described above, if it is determined that the control command satisfies the second condition, the information processing apparatus 1 halts the execution of the control command. With this configuration, the information processing apparatus 1 suppresses the execution of, for example, a malicious control command.

Furthermore, according to the embodiment described above, the information processing apparatus 1 determines, by using the history of the control commands each of which is stored every time the information processing apparatus 1 receives the control command operated from the terminal device 2, whether the control command operated this time satisfies the additional condition in terms of the relationship with the control command operated in the past. With this configuration, by using the history of the control commands, the information processing apparatus 1 can verify the validity of the control command that is operated this time by going back to the past; therefore, it is possible to improve the reliability of the control command.

Furthermore, according to the embodiment described above, the first condition, the additional condition, and the second condition are the conditions for considering a control command as malicious. With this configuration, by using the first condition, the additional condition, and the second condition, the information processing apparatus 1 can suppress the execution of the control command that can be considered to be malicious. Furthermore, by setting only the condition in which a control command is assumed to be good faith to the first condition, the additional condition, and the second condition, it is possible to suppress the execution of the control command that does not meet these conditions.

Others

In the data filtering system 9 according to the embodiment, a description has been given of a case in which, for example, a driver who drives a vehicle brings the terminal device 2 into the vehicle and uses the terminal device 2 as the control panel of the vehicle via the control application 21. The vehicle mentioned here means a small-sized electricity automobile; however, the vehicle is not limited to this and any vehicle may also be used as long as a vehicle, such as an automobile, a light vehicle, a motorized bicycle, or the like, that runs on a road. Furthermore, a railway vehicle may also be used.

Furthermore, a description has been given of a case in which the information processing apparatus 1 according to the embodiment selects, on the basis of the condition that is used to detect the malicious control command stored in the filtering condition storing unit 131, the control command operated from the terminal device 2. However, the information processing apparatus 1 is not limited to this and may also check the validity of the terminal device 2 that sends a control command and may select the subject control command by using the conditions stored in the filtering condition storing unit. With this configuration, the information processing apparatus 1 can protect a vehicle from a threat of the terminal device 2 itself that is malicious.

Furthermore, the information processing apparatus 1 according to the embodiment can be implemented by mounting, on a device, such as a known personal computer, workstation, or the like, each of the functions performed by the vehicle state detection unit 141, the filtering unit 142, the execution processing unit 143, the abnormality processing unit 144, and the like.

Furthermore, the components of each device illustrated in the drawings are not always physically configured as illustrated in the drawings. In other words, the specific shape of a separate or integrated device is not limited to the drawings; however, all or part of the device can be configured by functionally or physically separating or integrating any of the units depending on various loads or use conditions. For example, the analyzing unit 142b and the additional condition determination unit 142c may also be integrated as a single unit. Furthermore, the storing unit 13 may also be an external device of the information processing apparatus 1 and connected via a network.

Figure 6:
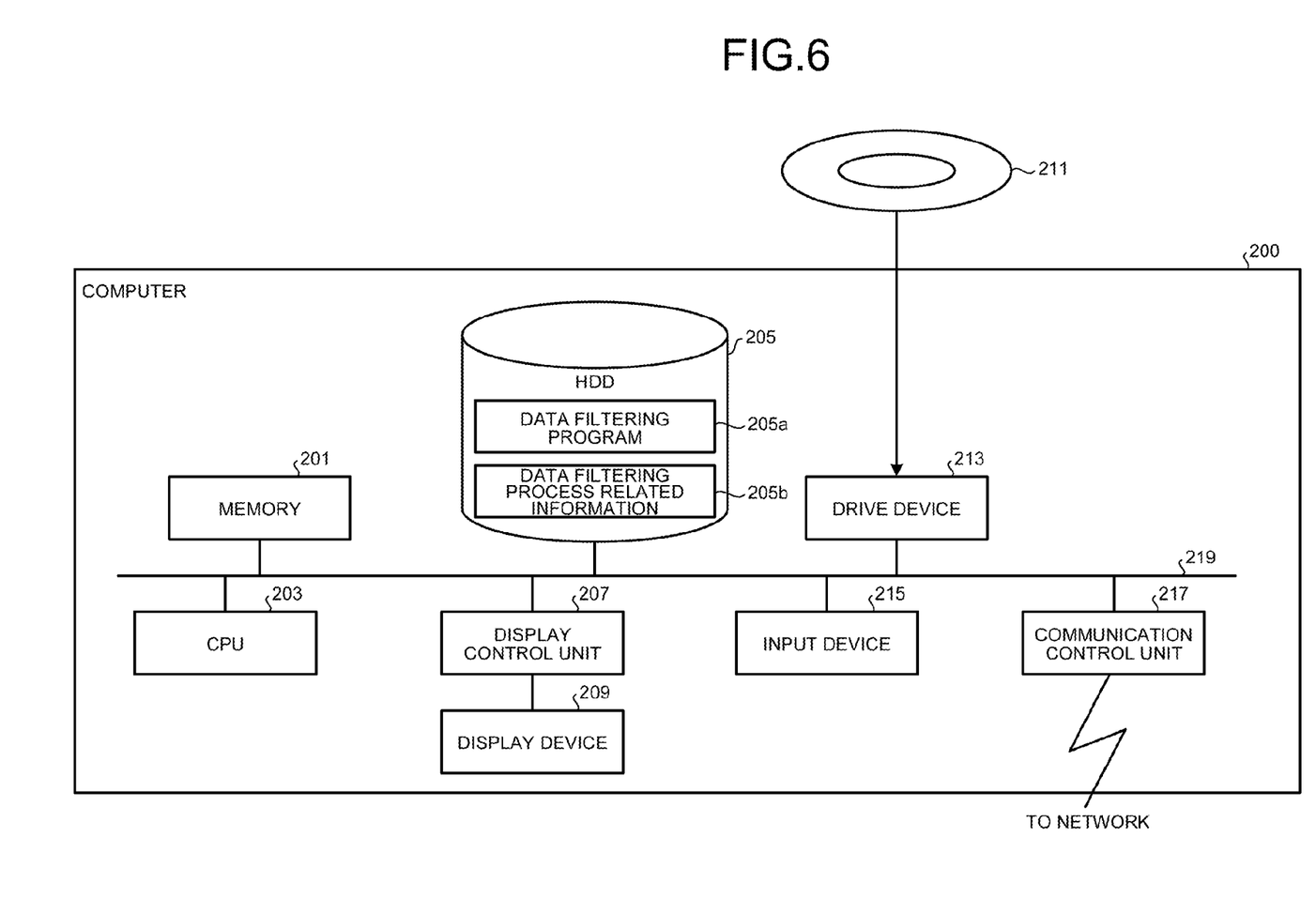
FIG. 6 is a schematic diagram illustrating an example of a computer that executes the data filtering program.

Furthermore, the various processes described in the embodiments can be implemented by a program prepared in advance and executed by a computer such as a personal computer or a workstation. Accordingly, in the following, an example of a computer that executes a data filtering program that implements the same function as that performed by the information processing apparatus 1 illustrated in FIG. 2 will be described. FIG. 6 is a schematic diagram illustrating an example of a computer that executes the data filtering program.

As illustrated in FIG. 6, a computer 200 includes a CPU 203 that executes various kinds of arithmetic processing, an input device 215 that accepts an input of data from a user, and a display control unit 207 that controls a display device 209. Furthermore, the computer 200 includes a drive device 213 that reads a program or the like from a storage medium and a communication control unit 217 that gives and receives data with another computer via the network. Furthermore, the computer 200 includes a memory 201 and an HDD 205 that temporarily store therein various kinds of information. Furthermore, the memory 201, the CPU 203, the HDD 205, the display control unit 207, the drive device 213, the input device 215, and the communication control unit 217 are connected by a bus 219.

The drive device 213 is a device used for, for example, a removable disk 211. The HDD 205 stores therein a data filtering program 205a and data filtering process related information 205b.

The CPU 203 reads the data filtering program 205a, loads the program in the memory 201, and executes the program as a process. The process is associated with each of the functioning units included in the information processing apparatus 1. The data filtering process related information 205b is associated with the filtering condition storing unit 131 and the log storing unit 132. Then, for example, the removable disk 211 stores therein each of the pieces of the information, such as the data filtering program 205a or the like.

Furthermore, the data filtering program 205a does not need to be stored in the HDD 205 from the beginning. For example, the program is stored in a "portable physical medium", such as a flexible disk (FD), a CD-ROM, a DVD disk, a magneto-optic disk, an IC CARD, or the like, that is to be inserted into the computer 200. Then, the computer 200 may also read and execute the data filtering program 205a from the portable physical medium.

According to an aspect of an embodiment of the present invention, it is possible to improve the reliability of execution related to data sent from outside.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus that executes a control instruction sent from a terminal device to control an operation of a vehicle, the information processing apparatus comprising:

a processor; and a memory, wherein the processor executes:

analyzing, when the control instruction sent from the terminal device satisfies a first condition, whether the control instruction is content that includes therein an additional condition that is related to the first condition;

first determining, when it is analyzed at the analyzing that the control instruction is the content that includes therein the additional condition that is related to the first condition, whether the control instruction satisfies the additional condition;

second determining, when it is determined at the first determining that the control instruction satisfies the additional condition, whether the control instruction satisfies a second condition, the second condition being associated with the control instruction and being a condition of the vehicle that is malicious when the control instruction is accepted; and executing a process to control the operation of the vehicle in accordance with the determination performed at the second determining.

2. The information processing apparatus according to claim 1, wherein, when it is determined at the second determining that the control instruction satisfies the second condition, the executing halts the execution of the control instruction.

3. The information processing apparatus according to claim 1, wherein the first determining determines, by using the history of the control instructions each of which is stored every time the control instruction sent from the terminal device is received, whether the control instruction operated from the terminal device satisfies the additional condition in terms of the relationship with the control instruction operated in the past.

4. The information processing apparatus according to claim 1, wherein the first condition, the additional condition, and the second condition are conditions for considering the control instruction as malicious.

5. A non-transitory computer-readable recording medium having stored therein a data filtering program that causes a computer that executes a control instruction that is sent from a terminal device to execute a process to control an operation of a vehicle, the process comprising:

analyzing, when the control instruction sent from the terminal device satisfies a first condition, whether the control instruction is content that includes therein an additional condition that is related to the first condition;

determining, when it is analyzed at the analyzing that the control instruction is the content that includes therein the additional condition that is related to the first condition, whether the control instruction satisfies the additional condition;

determining, when it is determined at the determining that the control instruction satisfies the additional condition, whether the control instruction satisfies a second condition, the second condition being associated with the control instruction and being a condition of the vehicle that is malicious when the control instruction is accepted; and executing a process to control the operation of the vehicle in accordance with the determination.

\* \* \* \* \*